United States Patent [19]

Waltman et al.

[11] Patent Number: 4,787,302
[45] Date of Patent: Nov. 29, 1988

[54] POSITIONING LEVER FOR A ROTISSERIE GRILL

[75] Inventors: John H. Waltman; Wesley J. Stewart, both of Pontiac; Gerald E. Leroux, Clarkston, all of Mich.

[73] Assignee: JWG Enterprises, Pontiac, Mich.

[21] Appl. No.: 109,600

[22] Filed: Oct. 19, 1987

[51] Int. Cl.⁴ .............................................. A47J 37/04
[52] U.S. Cl. ........................................ 99/427; 99/449
[58] Field of Search ......... 99/421 R, 421 H, 421 HH, 99/421 HV, 426, 427, 449; 16/239; 292/83, 86, 124, 127

[56] References Cited

U.S. PATENT DOCUMENTS

| | | | |
|---|---|---|---|
| 1,091,233 | 3/1914 | Mitchell | 16/239 |
| 1,869,815 | 8/1932 | Katz | 292/341.18 |
| 2,614,486 | 10/1952 | Horvat et al. | 99/421 HV |
| 2,967,557 | 1/1961 | Tait et al. | 411/349 |
| 3,151,901 | 10/1964 | Ahlgren | 292/124 |
| 3,550,412 | 12/1970 | Pitel et al. | 70/461 |
| 4,505,195 | 3/1985 | Waltman | 99/427 |
| 4,593,613 | 6/1986 | Waltman | 99/427 |

FOREIGN PATENT DOCUMENTS 430651  2/1948  Italy ..................................... 292/86

Primary Examiner—Harvey C. Hornsby
Assistant Examiner—Stephen F. Gerrity
Attorney, Agent, or Firm—Basile and Hanlon

[57] ABSTRACT

A positioning lever for use with a rotisserie cradle of the type wherein clamping rods may be angularly and radially disposed for the containment of food therein by means of rotational adjustment of two pairs of slotted plates disposed at either end thereof. The positioning lever allows the clamping rods to be quickly and easily repositioned.

5 Claims, 1 Drawing Sheet

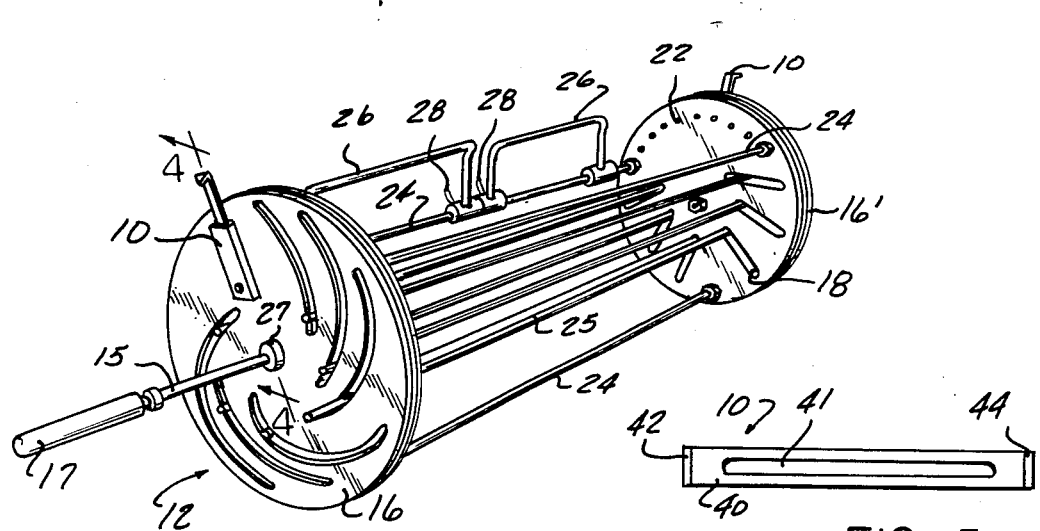
FIG-1
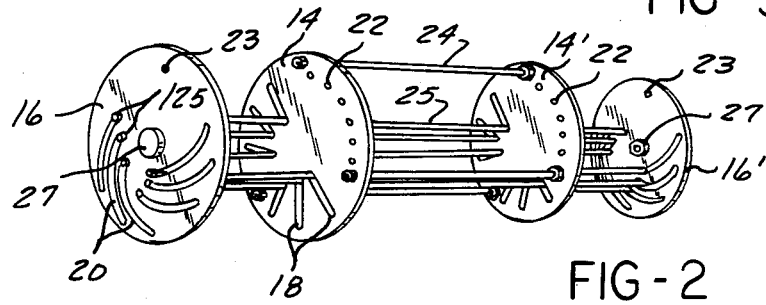
FIG-5
FIG-2
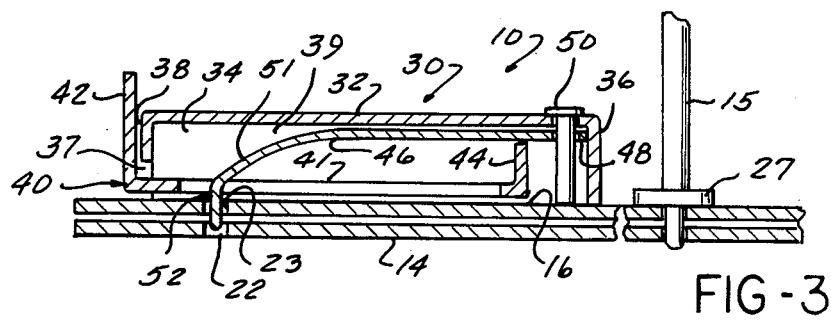
FIG-3
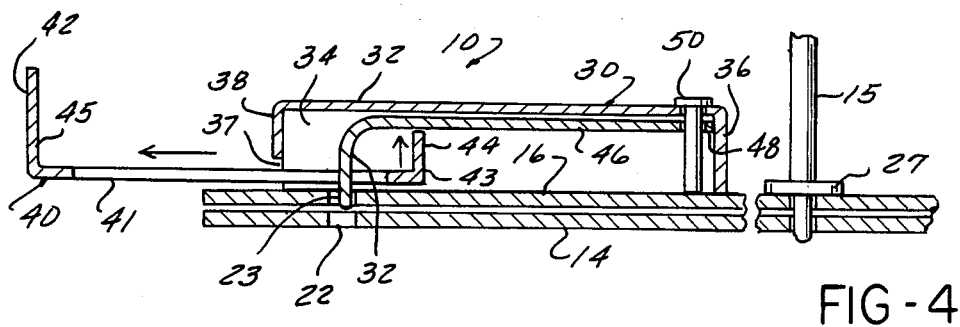
FIG-4

POSITIONING LEVER FOR A ROTISSERIE GRILL

BACKGROUND OF THE INVENTION

1. Field of the Invention:

The present invention relates to rotisseries and, in particular to a barbecue apparatus in which food is adapted to be mounted and rotated above a source of heat.

2. Description of the Prior Art:

Food, such as meat to be grilled, is generally placed on a spit which is rotatable to expose the meat to the heat in order to insure uniform cooking of the same. In cooking large or whole pieces of meat, such as a pig roast or a large side of beef, the spit may not be capable of rotatably supporting the meat to be grilled because of its shape. In many situations, the spit is provided with forks that are carried thereon and which pierce the opposite ends of the meat; however, after a considerable amount of rotation of the spit, the forks sometimes break loose of the meat and the meat fails to rotate, thus causing uneven heating and cooking of the same. Additionally, because the meat must be pierced through by the spit, an undue amount of the meat juices are lost during the cooking process, thus causing the meat to be unnecessarily dry.

In my issued U.S. Pat. No. 4,505,195, the disclosure of which is hereby incorporated by reference, I disclose a novel rotisserie which completely overcomes the aforementioned problems. The rotisserie includes a cradle for supporting food to be cooked. The cradle comprises a pair of end plates with a plurality of longitudinally disposed rod members extending therebetween. The end plates each have a plurality of radially disposed slots. Control plates are rotatably mounted with respect to the end plates and are provided with a plurality of spiral shaped slots. Each of the plurality of rods extends through one radial slot in each end plate and one spiral rod in each control plate. The rods are movable within the slots as the plates are rotated with respect to each other such that the radial and angular position of the clamping rods with respect to the axis of rotation of the cradle may be selectively and independently varied along the length of the cradle. Thus, the longitudinally disposed rods may be selectively positioned at radial distances from the axis of rotation to clamp the meat to be cooked within the cradle. In order to lock the control plates with respect to the end plates at the preselected position, a simple lock pin is disclosed which extends through a single aperture disposed in the control plate and through one of a plurality of spaced apertures disposed around the periphery of the end plates.

The lock pin disclosed in U.S. Pat. No. 4,505,195 suffers from certain deficiencies in use. While the lock pin functions effectively to lock the position of the plates with respect to each other, it is somewhat difficult to both remove and install, particularly if the position of the rods must be changed during use, during which time the whole rotisserie is very hot. Additionally, the control plates must be rotated manually in order to align the apertures. This is somewhat difficult to do since the apertures are fairly small, and since no means is disclosed for rotating the control plates. Again, the problem is even more acute when the rotisserie is in use and is hot. Another problem with use of the lock pin disclosed in the above-referenced patent is that it is quite small and is a separate structure from the rest of the rotisserie. Hence, it is quite easy for the lock pin to become separated from the rotisserie and lost.

Thus, it would be desirable to provide an easy and efficient way of positioning the control plates with respect to the end plates, even while the rotisserie is in use.

It would also be desirable to provide a means of securely locking the position of the plates with respect to each other which is permanently mounted on the rotisserie and is not a separate member.

It would be highly desirable to provide a locking means permanently mounted to the rotisserie which also serves as a positioning means.

SUMMARY OF THE INVENTION

What is disclosed and claimed herein is a positioning lever used with rotisserie cradle of the type disclosed in U.S. Pat. No. 4,505,195. The positioning lever comprises a housing, including a top, opposed side walls, a first open end and a second closed end to define a slot therein. The housing is disposed on an outer surface of each control plate such that a first end is disposed over an aperture therein and a second end extends radially toward the shaft means. A biasing means is disposed in the slot and has first and second ends, the first end being attached to the housing. A pin is formed on the second end of the biasing means and extends toward the control plate. The pin is capable of moving from a first position, wherein it extends through the aperture in the control plate and a first one of the plurality of apertures in the inner end plate which has been aligned therewith, to a second position wherein the pin extends only through the aperture in the control plate. The pin is normally biased into the first position by biasing means. Finally, the positioning lever comprises a lever which has first and second ends. The first end of the lever is slidably disposed in the slot between the biasing means and the control plate. The second end extends from the housing. The lever has an extension formed on the first end which extends toward the biasing means.

By means of the positioning lever, the radial and angular position of the clamping rods may be adjusted and securely fixed in a selected position. In order to perform the adjustment, radial force is first applied in an outward direction to the second end of the lever, thereby causing the lever to be slidably disposed at least partly out of the slot, the biasing means to be urged away from the control plate by the extension on the first end of the lever, and the pin to move into the second position. Then, rotational force is applied to the second end of the lever to rotate the control plate with respect to the end plate and align the aperture in the control plate with a second one of the plurality of apertures in the inner end plate, thereby causing the plurality of longitudinally disposed clamping rods of the cradle to be set at a preselected position. The preselected position is fixed by slidably displacing the lever back into the housing and allowing the pin to move back into the first position, whereby it extends through the aperture in the control plate and the second one of the plurality of apertures in the inner end plate.

Thus, the angular and radial position of the rods may be easily adjusted even while a piece of meat is in the cooking process. It is a very simple matter to pull each lever part way out of its slot, use the then extended levers to rotate the control plates with respect to the end plates until the clamping rods are in the desired position, and then push the levers back into the housings. It is not even necessary to correctly align the single aperture in the control plate with the one of the plurality of apertures in the inner end plate during the operation. After the levers have been pushed back into their housings, if the apertures are incorrectly aligned, the slightest twisting movement in both directions will cause correct alignment.

In order to provide better functioning for the positioning lever, further refinements may be added. For example, means forming a longitudinal slot may be disposed in the lever, medial of the first and second ends. In this case, the pin disposed on the second end of the biasing means will extend through the slot in the lever, and then into the aligned apertures. The slot performs the dual functions of allowing the lever to freely slide with respect to the pin, and also provides a means of preventing the lever from being pulled too far out of the housing.

A flange may also be provided on the top of the housing which extends part way down into the open end. This flange also has dual functions. First, it prevents the lever from being displaced axially with respect to the housing. Secondly, it prevents the accidental introduction of foreign matter into the slot and helps keep the positioning lever in operating condition. In another embodiment, the lever may further comprise a grip to assist the user in withdrawing the lever from the housing. The grip may comprise a tab disposed on the first end of the lever and extending away from the control plate.

BRIEF DESCRIPTION OF THE DRAWING

The various features, advantages and other uses of the invention described and claimed herein will become more apparent by referring to the following detailed description and drawing in which:

FIG. 1 is a perspective view of a rotisserie cradle depicting a positioning lever of the herein invention disposed on each control plate;

FIG. 2 is an exploded view of the rotisserie cradle of FIG. 1 showing the relation of the parts therein;

FIG. 3 is a cross-sectional view of the positioning lever shown in FIG. 1, taken along line 4—4, with the pin in the first position;

FIG. 4 is identical to FIG. 3 except that it shows the pin in the second position; and FIG. 5 is a plan view of the positioning lever shown in FIG. 2 illustrating the slot therein.

DETAILED DESCRIPTION OF THE PREFERRED EMBODIMENTS

Throughout the following description and drawing, an identical reference number is used to refer to the same components shown in multiple figures of the drawing.

Referring now to FIGS. 1 and 2, there is illustrated an embodiment of the present invention in the form of a positioning lever 10 disposed on each end of a rotisserie cradle 12. Specifically, as is shown in FIG. 2, the rotisserie cradle 12 comprises a pair of circular inner end plates 14 and 14' which are secured to each other at a fixed distance by means of stainless steel rods 24 having threaded ends (unnumbered) that are secured to the end plates 14 and 14' by a suitable means. In the preferred embodiment three such rods are employed to connect the inner end plates 14 and 14'. The inner end plate 14 has a shaft 15 mounted thereto that provides a means of supporting the rotisserie cradle 12 over a source of heat (not shown). The inner end plate 14' has a similar shaft (not shown), extending in an outward direction therefrom. Typically, one of the shafts will be adapted to engage a rotational rotisserie motor for rotating the rotisserie cradle 12, and the other shaft will typically have the handle formed thereon, such as handle 17 depicted in FIG. 1 and shown formed on shaft 15.

The end plate 14 and 14' each have a plurality of radial slots 18 that each receive one of a plurality of clamping rods 25. The opposite ends of each of the clamping rods 25 are threaded and extend through spiral slots 20 formed in each of a pair of control plates 16 and 16' where the clamping opposite threaded ends of the rods 25 are engaged by suitable fasteners, such as nuts 125. Engagement of nuts 125 with the threaded ends of the clamping rods 25, is loose enough to permit the clamping rods 25 to move within the slots 18 and 20 as the inner end plates 14, 14' and control plates 16, 16' are rotated relative to one another as will be described hereinafter. The control plates 16 and 16' each have a bushing 27, the internal bore of which rotatably receives the inner plate shafts 15 such that the inner end plates 14, 14' and control plates 16, 16' may be rotated relative to each other respectively. As can be seen in FIG. 2, when the control plates 16 and 16' are rotated relative to the inner end plates 14 and 14', the geometry of the spiral slots 20 and the radial slots 18 is such that the clamping rods 25 will be moved radially inward, toward the longitudinal axis of the rotisserie cradle 12. If both control plates 16, 16' are rotated the same amount, then the rods 25 at either end of the rotisserie cradle 12 will be moved inwardly the same radial distance. Obviously, if the control plate 16 is rotated to a lesser angular amount with respect to the end plate 14' than is the control plate 16' with respect to the end plate 14, the clamping rods 25 will be moved inwardly toward the longitudinal axis of the rotisserie cradle 12 along an incline. Thus, the clamping rods 25 can be disposed in a conical shape. This permits the clamping rods 25 to be used to clamp a piece of meat which is desired to be retained by the rotisserie cradle 12.

As can best be seen in FIG. 1, the inner end plates 14 and 14' are provided with a plurality of circumferentially spaced apertures 22 which are selectively alignable with a single aperture 23 formed in the control plates 16 and 16'. By means of the positioning lever 10, the inner end plates 14, 14' and control plates 16, 16' may be locked at any one of a selected number of relative angular positions in a manner to be described below.

In order to more securely hold the piece of meat to be cooked and at the same time provide easy access to the interior of the rotisserie cradle 12, the cradle 12 may further comprise braces 26 which are rotatably disposed on one of stainless steel rods 24. Means 28 are provided for releasably clamping the braces 26 to the stainless steel rod 24 when the braces 26 have been positioned to enclose a piece of meat (not shown). Clamping means 28 may be released when it is desired to open the braces 26 for access to the interior of rotisserie cradle 12.

One of the positioning levers 10 is depicted in greater detail in FIGS. 3, 4 and 5. FIG. 3 is a cross-sectional view taken along line 4—4 of FIG. 1 of a positioning lever 10 mounted to a control plate 16. Positioning lever 10 includes housing 30 which is comprised of a top 32, two opposed side walls 34, a closed back 36, and an open front 37. There is depicted in FIGS. 3 and 4 a flange 38 formed integral with the top 32 of housing 30 and extending part way down to partially enclosed the open end 37. The top 32, opposed side walls 24, closed back 36 and flange 38, together with control plate 16, define a slot 39.

A biasing means 46 is disposed in the slot 34 and has a first end 48 and a second end 51. The first end 48 is attached to housing 30 by a suitable means such as rivet 50. A pin 52 is formed on second end 51. Pin 52 is capable of moving from a first position depicted in FIG. 3, wherein pin 52 extends through the aperture 23 in the control plate 16 and a first one of the plurality of apertures 22 in the inner end plate 14 which as been aligned with the aperture 23 in the control plate 16, to a second position shown in FIG. 4 wherein the pin 52 extends through the aperture 25 in the control plate 16, but not through the aperture 22 in the inner end plate 14. The pin 52 is normally biased into the first position by the biasing means 46.

The positioning lever 10 of the instant invention further comprises a lever 40 having a first end 43 and a second end 45. The first end 43 is slidably disposed in the slot 39 in the housing 30 between the biasing means 46 and the control plate 16. The second end 45 of lever 40 extends from the housing 30. Lever 40 has an extension 44 formed on the first end 43 extending toward the biasing means 46.

As is best seen in FIG. 5, lever 40 further comprises a longitudinal slot 41 disposed therein. The purpose of longitudinal slot 41 is to permit pin 52 to extend therethrough and into aperture 23. Longitudinal slot 41 further serves the purpose of limiting the range of sliding motion of lever 40 with respect to slot 39.

In FIG. 3, lever 40 is shown disposed mostly inside of slot 39. In this position, extension 44 formed on lever 40 does not contact biasing means 46, and pin 52 is in the first position. When lever 40 is slidably disposed in a radial direction outward, as shown in FIG. 4, extension 44 will contact biasing means 46 and force it in an upward direction. This upward movement of biasing means 46 will cause pin 52 to withdraw from aperture 22 of inner end plate 14. Thus, the pin 52 will be in the second position shown in FIG. 4.

When pin 52 is in the first position, the positions of control plate 16 and inner end plate 14 with respect to each other is fixed. This causes the radial and angular position of clamping rods 25 to remain fixed. If it is desired to change the position of clamping rods 25 to enclose, for example, a different sizes piece of meat, the adjustment may easily be made by means of positioning levers 10 disposed on either end of rotisserie cradle 12. By grasping lever 40 and pulling it in an outward radial direction, pin 52 is moved into the second position depicted in FIG. 4. Since pin 52 no longer extends into aperture 22, control plate 16 and inner end plate 14 may be freely rotated with respect to each other. This rotation may be accomplished with the assistance of lever 40 by moving lever 40 in the direction of desired notation. The movement of the plates 14 and 16 with respect to each other will cause the clamping rods 25 to assume new positions. When they are in the position desired, lever 40 is simply pushed back into housing 30. This will cause the force on biasing means 46 imparted by extension 44, to be released. If aperture 23 has been aligned with a second one of the plurality of apertures 22, formed in end plate 14, pin 52 will again move back into the first position and extend through both apertures 23 and 22. Thus, the selected position is fixed.

Should aperture 27 not be aligned with one of the plurality of apertures 22 a slight rotational movement of control plate 16, relative to inner end plate 14, will cause pin 52 to click into one of the plurality of apertures 22 and fix the selected position.

Lever 40 may further comprise a tab 42 extending perpendicularly from the first end 45 thereof. Tab 42 extends in a direction away from control plate 16. The purpose of tab 42 is to form an easy means of gripping lever 40 when it is desired to re-position clamping rods 25.

Other variations and refinements of the positioning lever of the instant invention may be apparent to one skilled in the art without departing from the spirit of the inventive concept herein. While the invention has been described with respect to certain embodiments and exemplifications thereof, it is not intended to be so limited but solely by the claims appended hereto.

We claim:

1. In a rotisserie grill of the type comprising a cradle for supporting food to be cooked, said cradle having:
   first and second opposite end plates connected together and shaft means mounted to said plates, with a free end extending longitudinally outwardly therefrom, said end plates each having a plurality of radially disposed slots and means forming an aperture adjacent the periphery thereof;
   first and second control plates rotatably mounted on the shaft means associated with, respectively, said first and second end plates between said first and second end plates and said free ends of the shafts, said first and second control plates each having a plurality of spiral shaped slots;
   a plurality of longitudinally disposed clamping rods, each rod extending through one radial slot in each plate and one spiral slot in each control plate and movable within said slots as said plates are rotated with respect to each other such that the radial and angular position of said clamping rods with respect to the axis of rotation of each of said shafts may be selectively and independently varied across the length of the cradle; and
   means forming a plurality of spaced apertures adjacent the periphery of the first and second end plates and alignable with the apertures in the first and second control plates;
   wherein the improvement comprises a positioning lever disposed on an outer surface of each control plate, the positioning lever including:
   a housing including a top, opposed side walls, a first open end, and a second closed end to define a slot therein, the first end being disposed over the aperture in the control plate and the second end extending radially inwardly toward the shaft means;
   a biasing means disposed in the slot having first and second ends, the first end being attached to the housing;
   a pin formed on the second end of the biasing means and capable of moving from a first position, wherein it extends through the aperture in the control plate and a first one of the plurality of apertures in the end plate which has been aligned therewith, to a second position wherein the pin extends through the aperture in the control plate, said pin being biased into the first position; and
   a lever having first and second ends, the first end being slidably disposed in the slot between the biasing means and the control plate, and the second end extending from the housing, said lever having an extension formed on the first end extending toward the biasing means, wherein the radial and angular position of the clamping rods may be adjusted by first applying radial force in an outward direction to the second end of the lever, thereby causing the lever to be slidably disposed at least part way out of the slt and to bias the biasing means so as to urge the pin to move into the second position, and then applying rotational force to the second end of the lever to rotate the control plate with respect to the end plate and align the aperture in the control plate with a second one of the apertures in the end plate, thereby causing the plurality of longitudinally disposed clamping rods to be set at a preselected position, the preselected position being fixed by slidably displacing the lever back into the housing and allowing the pin to move back into the first position, whereby it extends through the aperture in the control plate and the second one of the plurality of apertures in the end plate.

2. The improvement of claim 1 wherein the lever further comprises means forming a longitudinal slot medial of the first and second ends thereof, wherein the pin extends first through the slot and then through the aperture in the control plate.

3. The improvement of claim 1 further comprising a flange formed on the top of the housing at an edge thereof adjacent the first, open end and extending in a direction toward the control plate to prevent axial displacement of the lever relative to the housing.

4. The improvement of claim 1 further comprising grip means disposed on the second end of the lever.

5. The improvement of claim 4 wherein the grip means comprises a tab extending perpendicularly from the lever in a direction away from the control plate.

* * * * *